(12) United States Patent
Topaloglu

(10) Patent No.: US 8,219,994 B2
(45) Date of Patent: Jul. 10, 2012

(54) WORK BALANCING SCHEDULER FOR PROCESSOR CORES AND METHODS THEREOF

(75) Inventor: Rasit O. Topaloglu, Santa Clara, CA (US)

(73) Assignee: GLOBALFOUNDRIES Inc.

( * ) Notice: Subject to any disclaimer, the term of this patent is extended or adjusted under 35 U.S.C. 154(b) by 914 days.

(21) Appl. No.: 12/256,703

(22) Filed: Oct. 23, 2008

(65) Prior Publication Data

US 2010/0107166 A1    Apr. 29, 2010

(51) Int. Cl.
    *G06F 9/46* (2006.01)
(52) U.S. Cl. .......................... 718/102; 712/229; 718/107
(58) Field of Classification Search .................. 718/107, 718/12
    See application file for complete search history.

(56) References Cited

U.S. PATENT DOCUMENTS

| | | | |
|---|---|---|---|
| 6,057,839 A * | 5/2000 | Advani et al. ................. | 715/784 |
| 6,173,306 B1 * | 1/2001 | Raz et al. ....................... | 718/102 |
| 6,496,823 B2 * | 12/2002 | Blank et al. ............................ | 1/1 |
| 6,711,691 B1 * | 3/2004 | Howard et al. ................. | 713/300 |
| 7,464,380 B1 * | 12/2008 | Hempel ......................... | 718/102 |
| 7,466,316 B1 * | 12/2008 | Alben et al. .................... | 345/502 |
| 7,509,646 B1 * | 3/2009 | Maw et al. ...................... | 718/105 |
| 7,565,651 B1 * | 7/2009 | Carey ............................. | 718/100 |
| 2002/0087903 A1 * | 7/2002 | Hermerding et al. ......... | 713/320 |
| 2004/0230981 A1 * | 11/2004 | Hamilton et al. ............. | 718/104 |
| 2008/0229318 A1 * | 9/2008 | Franke ........................... | 718/104 |
| 2008/0244227 A1 * | 10/2008 | Gee et al. ........................ | 712/30 |
| 2008/0271035 A1 * | 10/2008 | Yasukawa ....................... | 718/104 |
| 2009/0007120 A1 * | 1/2009 | Fenger et al. .................. | 718/102 |
| 2009/0094613 A1 * | 4/2009 | Maw et al. ...................... | 718/105 |
| 2009/0109230 A1 * | 4/2009 | Miller et al. ................... | 345/506 |
| 2009/0150695 A1 * | 6/2009 | Song et al. ..................... | 713/323 |
| 2009/0235260 A1 * | 9/2009 | Branover et al. .............. | 718/102 |
| 2009/0328047 A1 * | 12/2009 | Li et al. .......................... | 718/102 |
| 2010/0153758 A1 * | 6/2010 | Esliger et al. .................. | 713/320 |

* cited by examiner

*Primary Examiner* — Idriss N Alrobaye

(57) ABSTRACT

A data processing device assigns tasks to processor cores in a more distributed fashion. In one embodiment, the data processing device can schedule tasks for execution amongst the processor cores in a pseudo-random fashion. In another embodiment, the processor core can schedule tasks for execution amongst the processor cores based on the relative amount of historical utilization of each processor core. In either case, the effects of bias temperature instability (BTI) resulting from task execution are distributed among the processor cores in a more equal fashion than if tasks are scheduled according to a fixed order. Accordingly, the useful lifetime of the processor unit can be extended.

17 Claims, 2 Drawing Sheets

WORK BALANCING SCHEDULER FOR PROCESSOR CORES AND METHODS THEREOF

BACKGROUND

1. Field of the Disclosure

The present disclosure relates generally to data processing units, and more particularly to data processing systems having multiple processing cores.

2. Description of the Related Art

A data processing system, such as a computer system, typically employs one or more data processing units, such as central processing units (CPU) and graphical processing units (GPU), to execute tasks. Each data processing unit can have one or more processing cores, whereby each processing core is capable of executing tasks independently. Each processing core is composed of millions or billions of solid-state electronic devices, such as transistors. For example, many processing cores are composed of insulated gate field effect transistors (FETs).

The performance of a FET device can degrade over time. A typical cause of performance degradation is bias temperature instability (BTI), which refers to an increase in the absolute value of the FET's threshold voltage and consequent decrease in source/drain current and transconductance of the FET device. This performance degradation of the FETs can cause degradation in performance of the processing core associated with MOS device. BTI can result from a number of factors, such as charge trapping and interface states in the gate oxide of a FET device. In particular, negative bias temperature instability (NBTI) can occur in p-channel FET devices biased with negative gate voltages. Positive bias temperature instability (PBTI) can occur in n-channel MOS devices. Process technologies that make use of high-K dielectric materials can be especially susceptible to bias temperature instability. The increase to threshold voltages of the MOS devices due to BTI can eventually lead to failure of the data processing unit.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A data processing unit includes multiple processor cores, each of which executes scheduled tasks. In a conventional data processing system, tasks are scheduled for execution in a fixed order determined by the data processing unit, resulting in an uneven distribution of tasks. For example, the first processor core in the fixed order will typically be assigned tasks more frequently than other processor cores. The uneven distribution of tasks amongst processors results in some processor cores experiencing more factors that can lead to BTI. For example, the transistors of processor cores that are assigned tasks more frequently can experience more charge trapping, interface states, and other BTI factors than the transistors of processor cores that are assigned tasks less frequently. This allows processor cores experiencing more BTI factors to degrade more quickly than the other cores, reducing the useful lifetime of the data processing unit.

Figure 1:
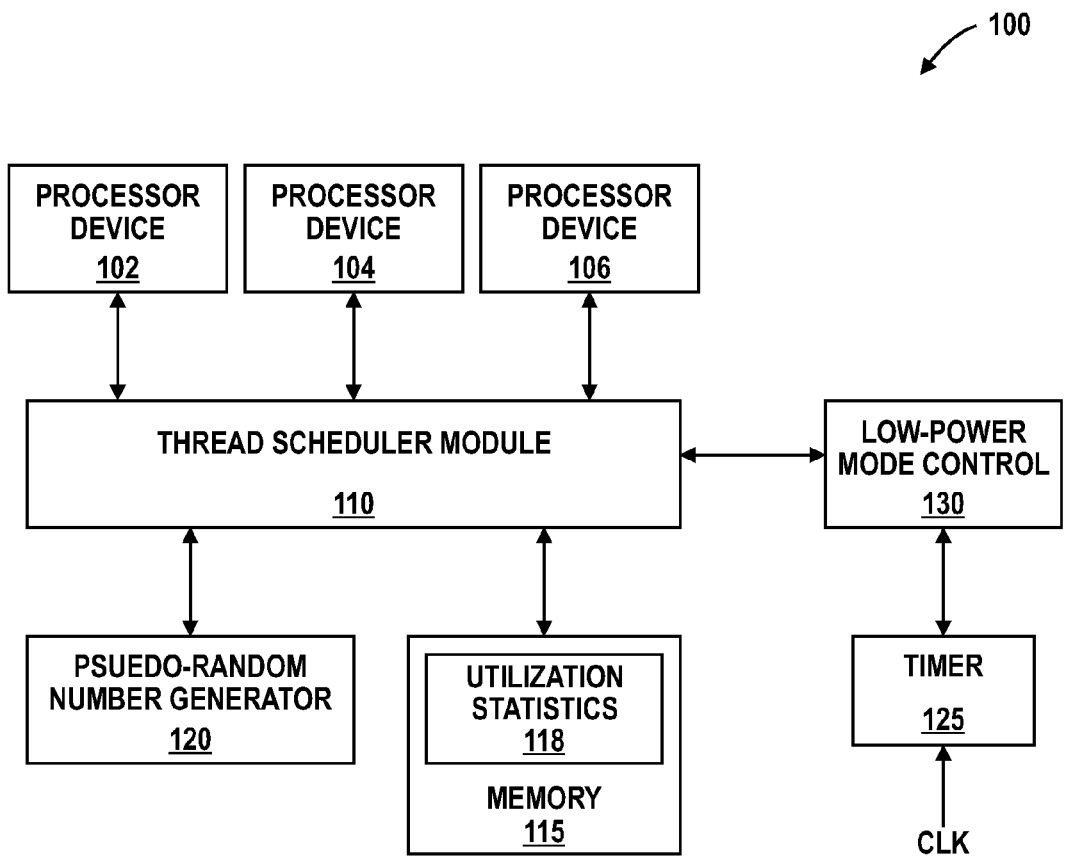
FIG. 1 illustrates in block diagram form a data processing unit in accordance with a specific embodiment of the present disclosure.
Figure 2:
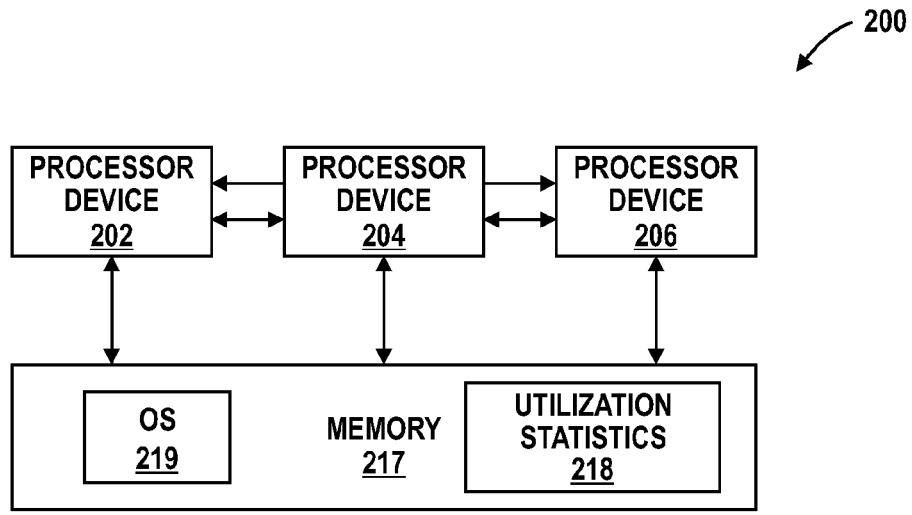
FIG. 2 illustrates in block diagram form a data processing unit in accordance with another particular embodiment of the present disclosure.
Figure 3:
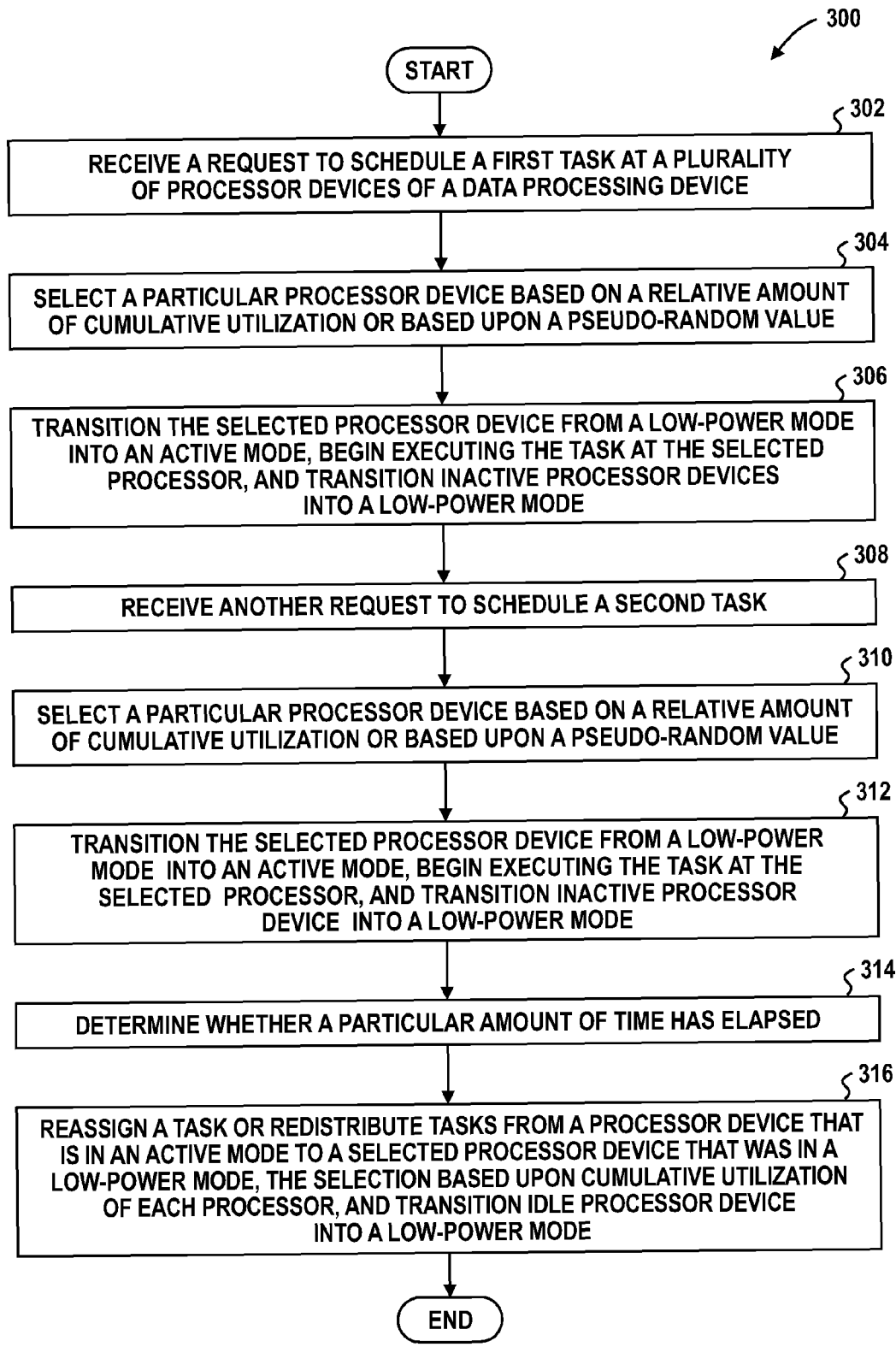
FIG. 3 is a flow chart illustrating a method for balancing processor usage in accordance with a specific embodiment of the present disclosure.

FIGS. 1-3 illustrate particular embodiments of a system whereby tasks are assigned to processor cores in a more distributed fashion. In one embodiment, the data processing unit can schedule tasks for execution amongst the processor cores in a pseudo-random fashion. In another embodiment, the processor core can schedule tasks for execution amongst the processor cores based on the relative amount of historical utilization of each processor core. In either case, the effects of bias temperature instability (BTI) resulting from task execution are distributed among the processor cores in a more equal fashion than if tasks are scheduled according to a fixed order. Accordingly, the useful lifetime of the processor unit can be extended.

FIG. 1 illustrates in block diagram form a data processing unit 100 in accordance with a specific embodiment of the present disclosure. Data processing unit 100 includes processor cores 102, 104, and 106, a thread scheduler module 110, a memory 115, a pseudo-random number generator 120, a low-power mode control module 130, and a timer 125. Memory 115 stores utilization statistics 118. Each of processor cores 102, 104, and 106 is connected to thread scheduler module 110. Thread scheduler module 110 is also connected to pseudo-random generator 120, memory 115, and low-power mode control module 130. Low-power mode control module 130 is also connected to timer 125. Timer 125 has an input to receive a clock signal labeled "CLK."

Each of processor cores 102, 104, and 106 can selectively operate in either an active mode or a low-power mode. A processor core that is operating in the active mode can execute instructions at the maximum speed for which the processor core is capable of operating. In a low-power mode, a processor core does not typically execute instructions at the same rate as in the active mode. Further, a supply voltage (not shown) provided to a processor core is typically reduced while the device is operating in the low-power mode, in order to reduce power consumption. For example, in the low-power mode, the processor core can be placed in a retention state, whereby the device does not execute instructions, but is able to retain stored data. A low-power mode may be characterized by the complete removal of operating power from the processor core. Accordingly, in the low-power mode, the activity of transistors associated with a processor core is typically reduced, thereby reducing the effects of BTI on the processor core.

Data processing unit 100 can configure a processor core to execute sets of instructions to perform assigned tasks. For purposes of discussion herein, a set of instructions scheduled for execution at a processor core is referred to as a thread. A thread may be a complete software application or a portion of the software application. Each of processor cores 102-106 can receive requests to execute a thread from thread scheduler module 110 and, in response, execute the associated thread. In the course of executing a thread, a processor core can determine that another task should be scheduled for execution. In response, the processor core can communicate a request to schedule the task to thread scheduler module 110.

In the illustrated embodiment, it is assumed that processor cores 102-106 enter and exit the active and low-power modes based on whether a task has been scheduled for execution at the processor core. Thus, for example, processor core 102 can exit the low-power mode and enter the active mode in response to receiving a request to execute a task. After completing execution of the task, the processor core 102 can exit the active mode and return to the low-power mode. In an embodiment, a processor core can wait a specified amount of time after completing execution of a task before entering the low-power mode, in order to determine if it will receive additional requests to execute tasks.

Pseudo-random number generator 120 is configured to receive requests for pseudo-random values. In response to a request, the pseudo-random number generator 120 determines a pseudo-random value and communicates it to the requesting device. In an embodiment, the pseudo-random number is a value generated by an algorithm implemented in either hardware or software to emulate substantially random behavior.

Memory 115 can include a non-volatile memory device, a hard disk memory device, an optical memory device, or another type of memory device that stores utilization statistics 118. Utilization statistics 118 include information indicative of the relative amount of utilization of each processor core of processor cores 102-106. In an embodiment, utilization statistics 118 can indicate the number of tasks assigned each processor core. In another embodiment, utilization statistics 118 can indicate the amount of time each processor core has spent in the active mode. Accordingly, the utilization statistics 118 provide an indication of the total accumulated operating time of each of processor cores 102-106 over a period of time, such as a day, a month, a year, or the entire lifetime of data processing unit 100.

Thread scheduler module 110 is configured to schedule tasks for execution at one of processor cores 102-106 based on utilization statistics 118 and pseudo-random values provided by pseudo-random number generator 120. In particular, one of processor cores 102-106 can communicate a request to thread schedule module 110 that a particular task be executed. In response, thread scheduler module 110 selects which of processor cores 102-106 will execute the task, and communicates a request to the selected processor core to execute the task. In one embodiment, thread scheduler module 110 selects the processor core to execute the task in a substantially random manner based on a value provided by pseudo-random number generator 120

In another embodiment, thread scheduler module 110 selects the processor core based on utilization statistics 118. For example, the thread scheduler module 110 can select the processor core that has been utilized the least according to utilization statistics 118. Further, thread scheduler module 110 can update utilization statistics 118 to indicate the selection of the processor core, so that utilization statistics 118 remain up-to-date.

Timer 125 is configured to reset a stored value and initiate adjustment of the stored value based on transitions of signal CLK in response to a start request. Accordingly, the stored value at timer 125 will reflect an indication of elapsed time after the start request. The elapsed time can be recorded in units such as seconds, or recorded as a number of clock cycles Low-power mode control module 130 is configured to control timer 125 to determine an amount of time each processor core of processor cores 102-106 has been in an active mode. Based on the determination, low-power mode control module 130 provides control information to thread scheduler module 110 to indicate whether a second processor core should be assigned a task.

To illustrate, processor core 102 can be in an active mode executing an operating system, while processor cores 104 and 106 are in low-power modes. The operating system can request two tasks be scheduled for execution, designated for purposes of discussion TaskA and TaskB. Processor core 102 communicates the request to the thread scheduler module 110. In response, thread scheduler module 104 requests processor core 104 execute both TaskA and TaskB. Processor core 104 enters the active mode and begins execution of the tasks.

In addition, low-power mode control module 130 provides a start request to timer 125, and periodically polls the stored value at timer 125 to determine if a specified amount of time has elapsed. If the specified amount of time has elapsed, low-power mode control module 130 indicates to thread scheduler module 110 that processor core 106 can be placed in the active mode. In response, thread scheduler module 110 determines if processor core 104 is still executing both TaskA and TaskB. If so, the thread scheduler module 110 reassigns TaskB to processor core 106.

FIG. 2 illustrates in block diagram form another data processing unit 200 in accordance with a particular embodiment of the present disclosure. Data processing unit 200 includes individual processor cores 202, 204, and 206, and memory 217. Memory 217 further includes an operating system 219 and utilization statistics 218. Each of processor cores 202, 204, and 206 are connected to memory 217 and with each other.

Memory 217 can include a hard disk drive, optical memory device, non-volatile memory, such as a basic input/output system (BIOS) flash memory device, random access memory (RAM), another type of memory device, or any combination thereof. Operating system 219 is stored in memory 217 and represents a program that can be executed at one or more processor cores of processor cores 202-206. The executing operating system program can include multiple sub-processes, which together can control the overall operation of data processing unit 200 by assigning and scheduling tasks to be performed by specific processor cores, and to place an individual processor core into a low-power mode when that device is not currently needed.

One sub-process administered by operating system 219 is the maintenance of cumulative utilization statistics 218 and the scheduling of tasks among the available processor cores 202-206 so that over a period of time, the cumulative utilization of each processor core is substantially equal. The operating system program or associated hardware can include a real time clock that can be used by the operating system to measure the elapsed time that each processor core is in an active mode. When a processor core of processor cores 202-206 is not presently needed, such as when no task is pending, that processor core can be placed into a low-power mode. During the time that a processor core is in the low-power mode, factors that can lead to BTI are reduced or substantially eliminated for that processor core. A task that can be assigned to an individual processor core can be associated with an application program, or can be associated with the operating system itself.

Operating system 219 also can make use of a pseudo-random number generator to substantially randomly determine to which processor core of processor cores 202-206 a new task should be assigned.

An operating system traditionally attempts to optimize only the current utilization of available processor cores to increase current real-time performance, and does not consider past cumulative utilization. Methods disclosed can potentially increase the useful lifetime of a data processing unit without limiting the practice of real-time performance optimization techniques.

FIG. 3 is a flow chart 300 illustrating a method for balancing processor usage in accordance with a specific embodiment of the present disclosure. At block 302, a request to schedule a first task at a plurality of processor cores of a data processing unit is received. At block 304, a particular processor core is selected based upon a relative amount of cumulative utilization or based upon a pseudo-random value. At block 306, the selected processor core, if it is not already in active mode, is transitioned from a low-power mode into an active mode, the selected processor begins executing the task, and inactive processor cores are transition into a low-power mode.

At block 308, another request to schedule a second task is received. At block 310, a particular processor core is selected based upon a relative amount of cumulative utilization or based upon a pseudo-random value. At block 312, the selected processor core is transitioned from a low-power mode into an active mode, the selected processor begins executing the task, and inactive processor cores are transitioned into a low-power mode. At block 314, it is determined whether a particular amount of time has elapsed. At block 316, a task is reassigned or tasks are redistributed from a processor core that is in an active mode to a selected processor core that was previously in a low-power mode, the selection based upon cumulative utilization of each processor, and transition idle processor cores into a low-power mode.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, data processing unit 100 represents one design implementation capable of ascertaining the relative cumulative utilization of multiple processor cores, and selecting a particular processor core to execute a task based upon the relative cumulative utilization. In addition, one skilled in the art will appreciate that although data processing unit 100 is illustrated as including three processor cores, the methods disclosed herein are applicable to data processing units that include two or more processor cores. Further, it will be appreciated that processor cores 102-106 can also represent separate data processing units in a data processing system. In addition, it will be appreciated that thread scheduler module 110, low-power mode control module 130, timer 125, pseudo-random number generator 120, and other modules can be fully or partially implemented in hardware, or can be implemented to include a software process that is running on an active one of processor cores 102-106. Utilization statistics 118 can include other information in addition to elapsed operating time. For example, utilization statistics 118 can include operating frequency and operating voltage information.

Skilled artisans will appreciate that other design implementations that include utilization statistics or a pseudo-random number generator can be used to implement a data processing unit capable of scheduling and assigning tasks to specific processor cores to substantially balance the relative cumulative utilization of multiple processors or processor cores. Furthermore, the methods described can address other reliability concerns such as hot-carrier injection (HCI) and time-dependent dielectric breakdown.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
receiving a first request, at a data processing device, to schedule execution of a first task;
selecting a first processor core of a plurality of processor cores at the data processing device in response to the first request, where the first processor core is selected based on first cumulative utilization information indicative of a relative amount of cumulative utilization of each respective processor core of the plurality of processor cores; and
executing the first task at the first processor core in response to selecting the first processor core, wherein executing the first task comprises transitioning the first processor core from a low-power mode to a first active mode at a first time to execute the first task;
in response to determining a first amount of time has elapsed between the first time and a second time:
determining if the first processor core is in the first active mode;
in response to determining the first processor core is in the active mode,
transitioning a second processor core of the plurality of processor cores to a second active mode at a third time; and
transitioning the first processor core to an inactive state after migrating a task currently executing at the first processor core to the second processor core.

2. The method of claim 1, wherein the first information is indicative of a relative amount of processing time associated with each of the plurality of processor cores over the period of time.

3. The method of claim 1, further comprising:
receiving a second request to schedule execution of a second task at the plurality of processor cores;
selecting a second processor core of the plurality of processor cores based on second information selected from the group consisting of a second pseudo-random value and the first cumulative utilization information; and
executing the second task at the second processor core in response to selecting the second processor core.

4. The method of claim 3, wherein the first information and the second information are different.

5. The method of claim 1, wherein the cumulative utilization is measured over a period of time that exceeds one day.

6. The method of claim 1, wherein the cumulative utilization is measured over a period of time that exceeds one month.

7. The method of claim 1, wherein the cumulative utilization is measured over a period of time that exceeds one year.

8. The method of claim 1, wherein the first amount of time is user-programmable.

9. The method of claim 1, further comprising:
in response to determining a second amount of time has elapsed between the third time and a fourth time, determining if the second processor core is in the second active mode;

in response to determining the second processor core is in the active mode, transitioning a third processor core of the plurality of processor cores to the second active mode at a fifth time.

10. The method of claim 1, wherein the cumulative utilization information is stored at a non-volatile memory device.

11. A method, comprising:
receiving a first request to schedule execution of a first task at a data processing device;
in response to the first request, transitioning a first processor core of a plurality of processor cores of the data processing device from a low-power mode to a first active mode at a first time;
in response to determining a first amount of time has elapsed between the first time and a second time:
    determining if the first processor core is still in the first active mode;
    in response to determining the first processor core is in the active mode,
    transitioning a second processor core of the plurality of processor cores to a second active mode at a third time:
    selecting a second processor core of a plurality of processor cores at the data processing device, where the second processor core is selected based on first cumulative utilization information indicative of a relative amount of cumulative utilization of each respective processor core of the plurality of processor cores; and
    migrating a task from the first processor core to the second processor core and transitioning the first processor core to an inactive state.

12. The method of claim 11, wherein transitioning the second processor core comprises transitioning the first processor core to an inactive state after migrating the task.

13. The method of claim 11, wherein transitioning the first processor core comprises transitioning the first processor core in response to the first processor core being selected based on second cumulative utilization information indicative of a relative amount of cumulative utilization of the first processor core relative to the second processor core of the plurality of processor cores.

14. The method of claim 11, wherein the first information is indicative of a number of tasks scheduled at each of the plurality of processor cores over a period of time.

15. The method of claim 14, wherein the period of time exceeds one day.

16. The method of claim 11, further comprising:
in response to determining a second amount of time has elapsed between the third time and a fourth time, determining if the second processor core is in the active mode; and
in response to determining the second processor core is in the second active mode,
    transitioning a third processor core of the plurality of processor cores to a third active mode at a third time.

17. A device, comprising:
a plurality of processor cores comprising a first processor core and a second processor core; and
a thread scheduler module coupled to each of the plurality of processor cores, the thread scheduler module configured to:
    receive a request from the first processor core to schedule execution of a first task;
select one of the plurality of processor cores based on first cumulative utilization information indicative of a relative amount of cumulative utilization of each of the plurality of processor cores over a period of time; and communicate a request to the one of the plurality of processor cores to execute the first task; determine the one of the plurality of processor cores has transitioned from the low-power mode to the active mode at a first time;
in response to determining a first amount of time has elapsed between the first time and a second time, determining if the first processor core is in the active mode; and
in response to determining the first processor core is in the active mode, communicating a request to transition the second processor core from the low-power mode to the active mode and migrating a task executing at the first processor core to the second processor core.

* * * * *